(12) United States Patent
Croy et al.

(10) Patent No.: US 9,762,439 B2
(45) Date of Patent: *Sep. 12, 2017

(54) CONFIGURATION COMMAND TEMPLATE CREATION ASSISTANT USING CROSS-MODEL ANALYSIS TO IDENTIFY COMMON SYNTAX AND SEMANTICS

(71) Applicant: International Business Machines Corporation, Armonk, NY (US)

(72) Inventors: Timothy R. Croy, Ballymena (GB); Trevor Graham, Hillsborough (GB); Kevin M. Hamilton, Belfast (GB); Steven S. Shuman, Monument, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/188,832

(22) Filed: Jun. 21, 2016

(65) Prior Publication Data
US 2016/0301569 A1   Oct. 13, 2016

Related U.S. Application Data

(63) Continuation of application No. 13/631,458, filed on Sep. 28, 2012, now Pat. No. 9,417,892.

(51) Int. Cl.
*G06F 15/177* (2006.01)
*H04L 12/24* (2006.01)
(Continued)

(52) U.S. Cl.
CPC ........ *H04L 41/0813* (2013.01); *G06F 3/0482* (2013.01); *G06F 3/0484* (2013.01);
(Continued)

(58) Field of Classification Search
CPC .. H04L 41/0843; H04L 41/0853; H04L 41/16
(Continued)

(56) References Cited

U.S. PATENT DOCUMENTS 6,901,440 B1   5/2005   Bimm et al.
6,959,329 B2   10/2005  Thakor
(Continued)

OTHER PUBLICATIONS

Restriction Requirement from U.S. Appl. No. 13/631,458, dated May 19, 2015.
(Continued)

*Primary Examiner* — Philip B Tran
(74) *Attorney, Agent, or Firm* — Zilka-Kotab, P.C.

(57) ABSTRACT

In one embodiment, a computer program product for creating a configuration template for a set of devices includes a computer readable storage medium having program instructions embodied therewith. The program instructions are readable/executable by a hardware processor to cause the processor to separate, by the processor, existing syntactic models describing syntax from existing semantic models describing semantics prior to determining a command information and determine, by the processor, the command information for a plurality of devices. The program instructions also cause the processor to identify, by the processor, a command structure from the command information which is common to a set of devices from the plurality of devices, and associate, by the processor, the set of devices to a common configuration template.

11 Claims, 5 Drawing Sheets

(51) Int. Cl.
*G06F 9/445* (2006.01)
*G06F 3/0484* (2013.01)
*G06F 3/0482* (2013.01)

(52) U.S. Cl.
CPC ...... *G06F 9/44505* (2013.01); *H04L 41/0843* (2013.01); *H04L 41/0853* (2013.01); *H04L 41/0893* (2013.01); *H04L 41/16* (2013.01); *H04L 41/22* (2013.01)

(58) Field of Classification Search
USPC .......................................... 709/220, 223–224
See application file for complete search history.

(56) References Cited

U.S. PATENT DOCUMENTS

| | | |
|---|---|---|
| 6,978,301 B2 | 12/2005 | Tindal |
| 7,054,946 B2 | 5/2006 | Tindal et al. |
| 7,065,562 B2 | 6/2006 | Courtney |
| 7,150,037 B2 | 12/2006 | Wolf et al. |
| 7,200,548 B2 | 4/2007 | Courtney |
| 7,246,162 B2 | 7/2007 | Tindal |
| 7,246,163 B2 | 7/2007 | Tindal |
| 7,249,170 B2 | 7/2007 | Tindal et al. |
| 7,313,625 B2 | 12/2007 | Tindal et al. |
| 7,366,893 B2 | 4/2008 | Tindal et al. |
| 7,454,145 B2 | 11/2008 | Weaver et al. |
| 7,461,158 B2 | 12/2008 | Rider et al. |
| 7,464,145 B2 | 12/2008 | Strassner |
| 7,558,847 B2 | 7/2009 | Strassner |
| 7,581,207 B2 | 8/2009 | Bolder et al. |
| 7,650,396 B2 | 1/2010 | Tindal |
| 8,010,952 B2 | 8/2011 | Datla et al. |
| 8,601,091 B2 | 12/2013 | Venouss |
| 8,782,182 B2 | 7/2014 | Chaturvedi et al. |
| 8,903,965 B2 | 12/2014 | Fong et al. |
| 9,417,892 B2 | 8/2016 | Croy et al. |
| 9,680,703 B2 | 6/2017 | Croy et al. |
| 2002/0161888 A1 | 10/2002 | McGuire |
| 2003/0051008 A1 | 3/2003 | Gorthy et al. |
| 2009/0287913 A1 | 11/2009 | Woods et al. |
| 2014/0095677 A1 | 4/2014 | Croy et al. |
| 2015/0339135 A1 | 11/2015 | Croy et al. |
| 2015/0341214 A1 | 11/2015 | Croy et al. |
| 2015/0341215 A1 | 11/2015 | Croy et al. |

OTHER PUBLICATIONS

Non-Final Office Action from U.S. Appl. No. 13/631,458, dated Jul. 29, 2015.
Croy et al., U.S. Appl. No. 13/631,458, filed Sep. 28, 2012.
Croy et al., U.S. Appl. No. 14/815,915, filed Jul. 31, 2015.
Croy et al., U.S. Appl. No. 14/815,926, filed Jul. 31, 2015.
Croy et al., U.S. Appl. No. 14/815,933, filed Jul. 31, 2015.
Final Office Action from U.S. Appl. No. 13/631,458, dated Feb. 2, 2016.
Notice of Allowance from U.S. Appl. No. 13/361,458, dated May 6, 2016.
Non-Final Office Action from U.S. Appl. No. 14/815,915, dated Jun. 17, 2016.
Final Office Action from U.S. Appl. No. 14/815,915, dated Dec. 30, 2016.
Notice of Allowance from U.S. Appl. No. 14/815,915, dated Feb. 7, 2017.
Notice of Allowance from U.S. Appl. No. 13/631,458, dated May 6, 2016.
Corrected Notice of Allowance from U.S. Appl. No. 13/631,458, dated Jul. 1, 2016.
Notice of Allowance from U.S. Appl. No. 14/815,915, dated Apr. 11, 2017.

CONFIGURATION COMMAND TEMPLATE CREATION ASSISTANT USING CROSS-MODEL ANALYSIS TO IDENTIFY COMMON SYNTAX AND SEMANTICS

BACKGROUND

The present invention relates to networks and networking systems, and more particularly, this invention relates to making changes to networking devices in a network, such as a cloud computing network.

Network devices and complex computer systems, such as cloud computing networks, data centers, managed service providers, traditional internet protocol (IP) networks, etc., typically include a diverse mix of operating systems and device types, both physical and virtual, which may be acquired from various different vendors. This diverse mix of devices and operating systems presents a problem for an operator attempting to effect a change across a large portion of one of these complex systems as it requires a high degree of domain knowledge in order to determine the applicability of any potential change. In some instances, it may even require an amount of trial and error to determine the applicability of the potential change. One conventional approach to address this problem involves creating a single set of changes (a template) for every combination of hardware and software. However, this approach leads to a large degree of duplication and requires almost constant maintenance as new hardware and software revisions are deployed.

Accordingly, it would be beneficial to have an approach to effecting a change across a large portion of one of these complex systems that avoids the issues associated with conventional approaches, such as creating a single set of changes for every combination of hardware and software.

BRIEF SUMMARY

In one embodiment, a computer program product for creating a configuration template for a set of devices includes a computer readable storage medium having program instructions embodied therewith. The program instructions are readable/executable by a hardware processor to cause the processor to separate, by the processor, existing syntactic models describing syntax from existing semantic models describing semantics prior to determining a command information and determine, by the processor, the command information for a plurality of devices. The program instructions also cause the processor to identify, by the processor, a command structure from the command information which is common to a set of devices from the plurality of devices, and associate, by the processor, the set of devices to a common configuration template. The program instructions readable/executable by the processor to cause the processor to determine, by the processor, command information for the plurality of devices further cause the processor to retrieve one or more commands for each device, extract command syntax, command inter-relationships, and parameter limitations for the one or more commands for each device, and store the command syntax, the command inter-relationships, and the parameter limitations for the one or more commands for each device to a command index.

According to another embodiment, a computer program product includes a computer readable storage medium having program instructions embodied therewith. The program instructions are readable/executable by a hardware processor to cause the processor to retrieve, by the processor, one or more commands for each device of a plurality of devices from existing syntactic and semantic models created for individual variants of devices, and identify, by the processor, a command structure from the one or more commands which is common to a set of devices from the plurality of devices. The program instructions also cause the processor to associate, by the processor, the set of devices to a common configuration template, extract command syntax, command inter-relationships, and parameter limitations for the one or more commands for each device, and store the command syntax, the command inter-relationships, and the parameter limitations for the one or more commands for each device to a command index. The program instructions readable/executable by the processor to cause the processor to identify, by the processor, the common command structure are further readable/executable by the processor to cause the processor to store, by the processor, checksums for the command syntax for the one or more commands for each device to the command index, and compare, by the processor, the checksums in the command index to identify common entries in order to determine models which share one or more common commands.

Other aspects and embodiments of the present invention will become apparent from the following detailed description, which, when taken in conjunction with the drawings, illustrate by way of example the principles of the invention.

DETAILED DESCRIPTION

Figure 1:
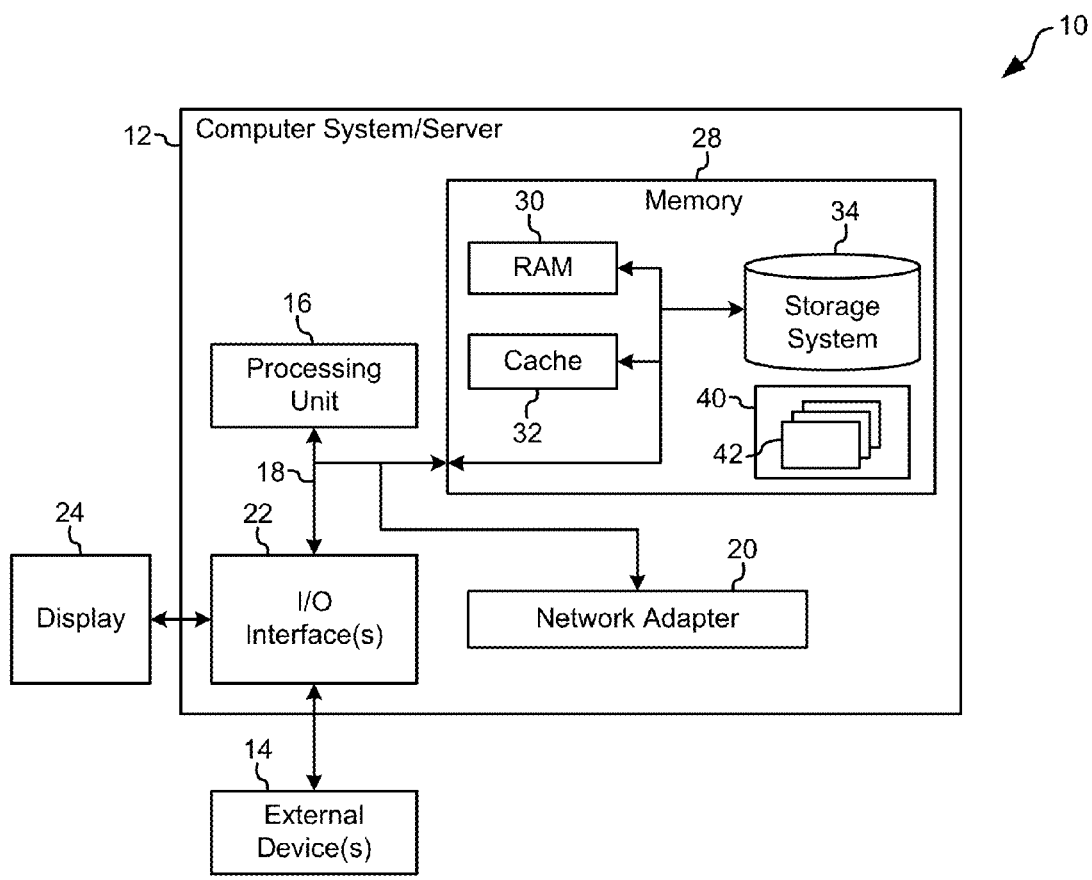
FIG. 1 depicts a cloud computing node, according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In one approach, an intelligent mechanism is provided to guide an operator during creation of new change sets that allows the change sets to exploit commonality across the devices and operating systems in a complex system, such as a cloud computing system. This approach reduces reliance on the operator's domain knowledge, which is a problem with conventional approaches to effecting large scale changes to complex computer systems. Furthermore, the intelligent mechanism also provides a method to determine if the change set is still applicable when new hardware or software is added to the complex computer system.

In one general embodiment, a computer program product for creating a configuration template for a set of devices includes a computer readable storage medium having computer readable program code embodied therewith, the computer readable program code including computer readable program code configured for determining command information for a plurality of devices, computer readable program code configured for identifying a command structure from the command information which is common to a set of devices from the plurality of devices, and computer readable program code configured for associating the set of devices to a common configuration template.

According to another general embodiment, a method for creating a configuration template for a set of devices includes determining command information for a plurality of devices, identifying a command structure from the command information which is common to a set of devices from the plurality of devices, and associating the set of devices to a common configuration template.

In yet another general embodiment, a computer program product for using a common configuration template for a set of devices includes a computer readable storage medium having computer readable program code embodied therewith, the computer readable program code including computer readable program code configured for identifying a set of devices from the plurality of devices which share a common configuration template applicable to a proposed change, wherein the common configuration template includes a collection of command variations, computer readable program code configured for determining which command from the collection of command variations is applicable to each device in the set of devices, and computer readable program code configured for executing the proposed change across all devices in the set of devices using the determined command for each device.

In another general embodiment, a method for using a common configuration template for a set of devices includes identifying a set of devices from the plurality of devices which share a common configuration template applicable to a proposed change, wherein the common configuration template includes a collection of command variations, determining which command from the collection of command variations is applicable to each device in the set of devices, and executing the proposed change across all devices in the set of devices using the determined command for each device.

It is understood in advance that although this disclosure includes a detailed description on complex computing systems, such as cloud computing systems and networks, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
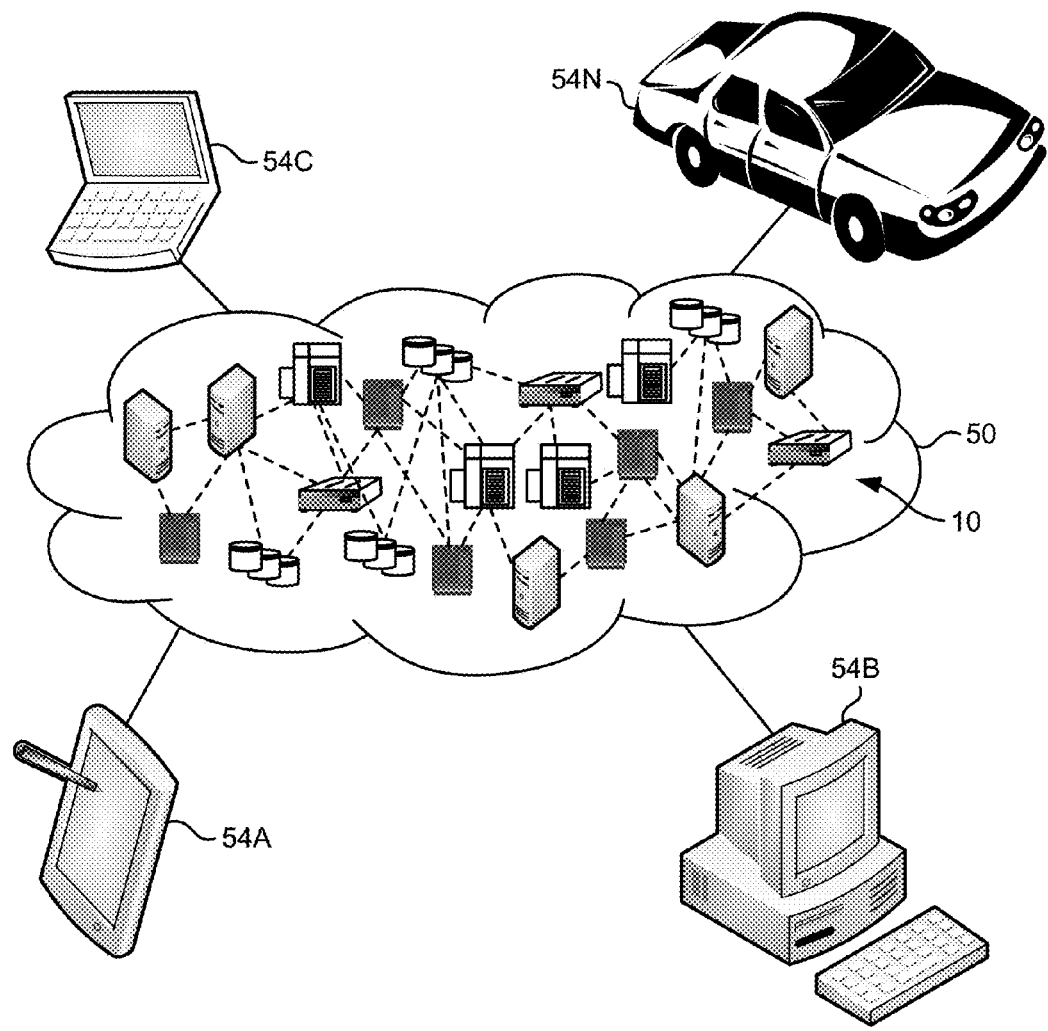
FIG. 2 depicts a cloud computing environment, according to one embodiment.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
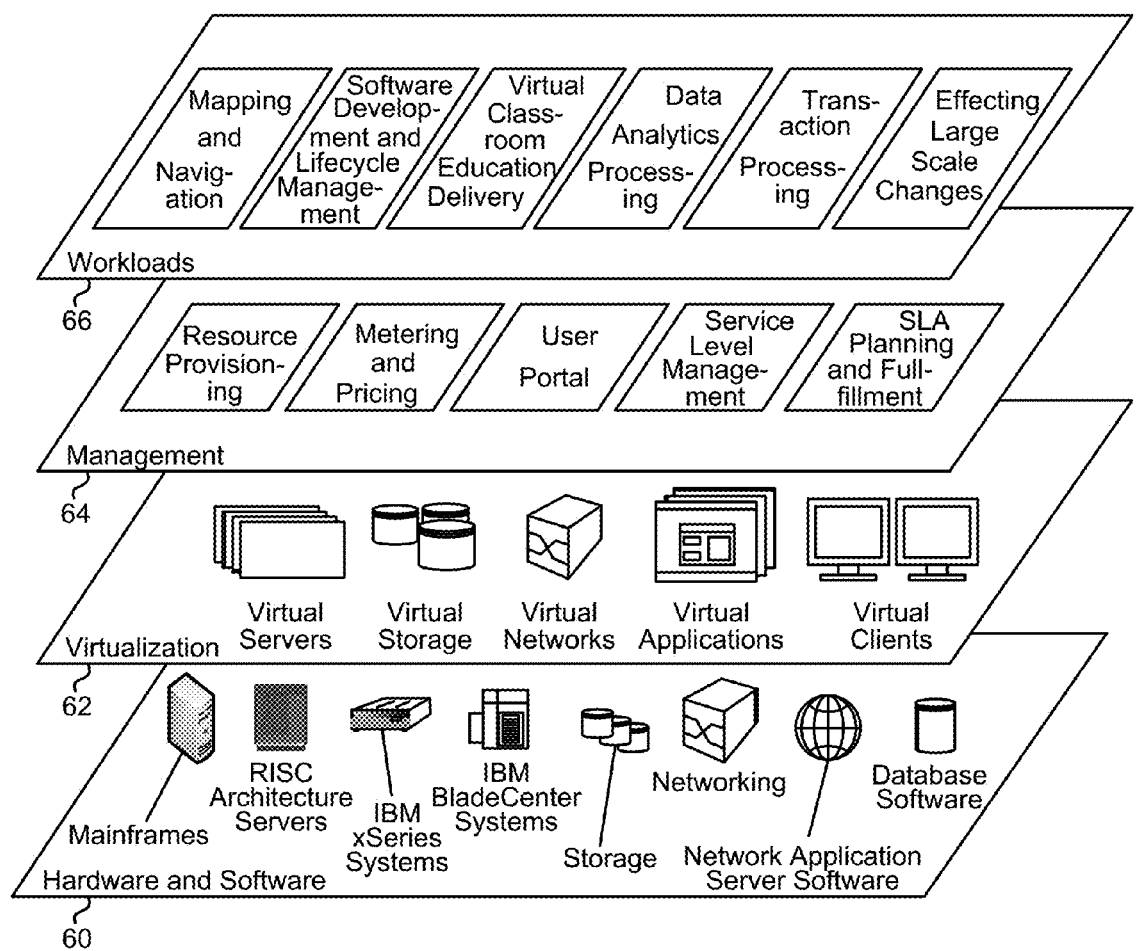
FIG. 3 depicts abstraction model layers, according to one embodiment.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; effecting large scale changes; etc.

According to various embodiments, a method for selecting an appropriate change to make to a network element or general complex computing resource is provided which improves upon conventional methods. For the descriptions presented herein, computing resources comprise a hardware component and a software operating system. Any applications installed on and available to the operating system or how the device (and specifically the hardware component) functions is controlled by how the software operating system is configured. For example, the system may be configured to allow telnet access or to allow secure shell (SSH) access or, for network devices, the system may be configured to control how packets are routed through a network.

The constant evolution of computing hardware and the ever increasing processing demands mean that computer networks are rarely composed of a single homogenous type of device, vendor of device, operating system, or other common trait. Additionally, an increased awareness of security threats results in network operators that are continually ensuring that the software on network devices are patched to the most up-to-date version to provide the utmost in security to the network. A single weak point in the network may allow a nefarious intruder to access sensitive, private, and/or confidential information across the network. This process of continual modification ensures that even in the best-controlled, most up-to-date network, there will always be a variation in the hardware and software platforms.

However, despite this constant churn in device and operating systems, there is a degree of commonality in the functions that may be configured between different devices, even those performing different roles within a network. Knowledge of the churn and domain required to understand the commands used to update all this equipment presents an ongoing challenge to the administrator of a system and network. In addition, there is a subset of items that need to be configured across many and/or all devices regardless of role or functionality, for example, setting access passwords, reconfiguring for new system names or access rights, etc.

Additionally, even if the administrator or user is able to construct a collection of change commands that will be applicable to their entire network, the application of the appropriate subset of commands to groups of devices requires the administrator or user to gather together the applicable devices in order to associate them with the desired change. These groups won't be fixed and depend on the commands being executed, which will vary between operating systems and software revisions.

Accordingly, in order to address all these issues, assistance is provided to the network administrator by providing at least the following information:

1. Based on the proposed change, the system advises the administrator on how many variations of the command sequence are required. The administrator may then create a command collection which groups all the variations that are required to fully address a particular set of device types.
2. At the point of execution, the system is capable of autonomously determining the particular variation of the commands which is applicable to a particular device, selecting from the command collection, and applying the commands to the correct device.
3. When a new device revision (hardware and/or software) is brought into the network, the system determines if any changes to existing command collections are appropriate based on the new device revision.
4. The system assesses an individual change and highlights the commands which are widely applicable and those which are not widely applicable. This provides help to the system administrator for an improved design of their change set.

According to one embodiment, these enhancements may be implemented within an existing system and/or network management product, such as an IBM® Tivoli Netcool Configuration Manager® (ITNCM), or any other network or system management product known in the art, as a command advisor tool. It may exploit any existing models for device configuration; however, the technique described could be applied to other schema or interface definitions.

According to one embodiment, the system management product may include a library of models for different devices (each model may be specific to a type or family of devices from one specific vendor, according to operating system, according to function, etc.). Each model may have syntactic, behavioral, and/or rendering aspects in various approaches. A retrieval process may retrieve the current configuration from the device, and using the syntactic part of the model, it may convert the native configuration into an internal representation of the configuration (such as an XML structure) for easier manipulation within the application.

The rendering aspects of the model may be used by a graphical user interface (GUI) to display the configuration to the administrator with appropriate annotations, such as a visual indication of the allowable range for a parameter. The administrator may make changes to the configuration by manipulating the GUI representation or by applying a previously saved configuration template, and then request that the change be applied to the device. Using the syntactic and behavioral aspects of the model, the management product may convert the changes that have been applied to the internal representation of the configuration into a series of commands that may be issued to the device, in order to influence its configuration to match the management product's internal representation.

The problem is that although the models accurately reflect the syntax and behavior of the device configuration interfaces, there is no persistent link between the models for different devices (i.e., the models are not normalized across distinct devices). This results in a possibility that a model for a given configuration element (for example, the configuration representing a duplex setting on a fast Ethernet interface) may not be the same between different vendors, such as a Cisco® and a Juniper® router, nor even between two different variants of a single vendor's device, such as two different Cisco® routers. Thus, in order to use the model to create a reusable configuration template that may be used to make a common change across a wide variety of devices in a complex network, the administrator still needs to determine for which set of devices the template will be valid (i.e., those devices which share a command structure for that specific configuration function).

This problem may be solved by creating a normalized model encapsulating all the different device-specific configuration syntaxes/semantics, thus allowing the administrator to express a template in a neutral form which may be translated to the specific device commands by the system with reference to the normalized model. This technique is described in more detail in U.S. Patent Application Pub. No. 2003/0051008A1 filed Aug. 29, 2001 to Gorthy et al., which is herein incorporated by reference.

However, the effort involved in creating such a normalized model is overwhelming and has prevented this approach from being successfully implemented in any but very specific applications.

In one embodiment, an alternative approach may be used whereby the system is configured to analyze all created models for all devices present in a network (or possibly all devices in use), and (with reference to the specific change template that the administrator creates) to automatically identify a set of devices which share a common command structure. Further, the system is configured to advise the administrator on how many additional change templates are required to implement the proposed change across the entire set of devices (installed in the network, currently in use, etc.). This eliminates the requirement for the administrator to understand how command structures vary across different devices, and minimizes the number of change templates that are needed to be created—thus reducing the effort and cost of maintaining the network.

The command advisor tool, according to one embodiment, is configured to inspect the existing syntactic and semantic models created for individual variants of devices and to identify command structures that are common across the devices (in terms of command syntax and device behavior). This may be achieved by first analyzing the individual device models to extract the commands, their inter-relationships, and/or parameter limitations. This analysis results in the creation of a searchable index relating commands and unique implementations, which may be used in future inspections.

This index may be achieved by separating the parts of the model which describe the syntax from those which describe the semantics of the commands. For ease of comparison, checksums for the syntax and semantics may be stored in the index. This allows the system to quickly find devices and their corresponding system models which share a command or range of commands. The system may inform the administrator when a particular change template is supported by a particular device.

When the administrator creates a configuration template for a set of devices, the administrator may start by choosing any one of the devices. The administrator creates the template by identifying which parts of the configuration is to be modified and in which way, which at execution time is converted to a set of native device commands (via existing functionality known in the art). The command advisor tool uses the searchable index to identify which additional models (and hence which additional devices) for which this template is also valid and may report to the administrator this information.

According to another embodiment, derivation of commonality between device syntaxes may be enabled which is only implemented for a constrained set of parameter values. In this case, the system may determine that the command syntax is the same between two or more device variants, but the range of allowable parameter values may be different, but overlapping; thus, the command advisor may present the administrator with a reduced range of allowable parameter values which increases the applicability of the command template.

In one exemplary embodiment, when setting a maximum transmission unit (MTU) on the GigabitEthernet interface of Cisco® networking equipment, there are multiple different versions (e.g., greater than fifteen different versions) of this command, differentiated by the range of values that the command is allowed to accept. The system described herein may derive the common range of parameter values which are valid across one, several, and/or all of these command variants. Thereafter, if the administrator respects this range in specifying parameter values, then the number of distinct command templates required is reduced.

Figure 4:
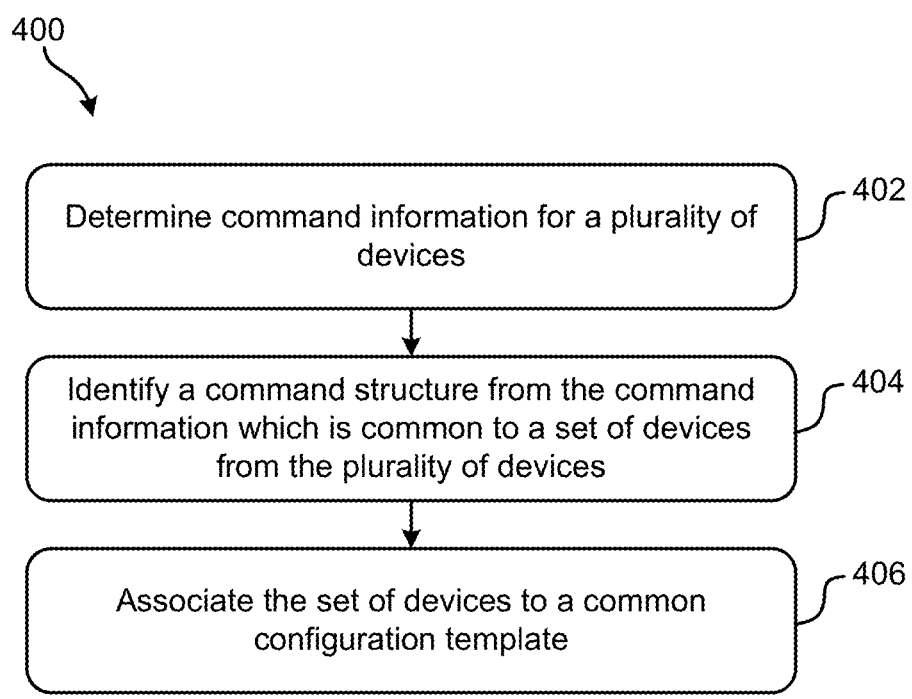
FIG. 4 shows a flowchart of a method, according to one embodiment.

Now referring to FIG. 4, a method 400 for creating a configuration template for a set of devices is described according to one embodiment. As an option, the present method 400 may be implemented in conjunction with features and/or architectures from any other embodiment described herein, such as those described with reference to FIGS. 1-3, among others. Referring again to FIG. 4, of course, method 400 and others presented herein may be used in various applications and/or in permutations which may or may not be specifically described in the illustrative embodiments described herein. Further, method 400 may be used in any desired environment known by one of skill in the art, whether described herein or not.

In operation 402, command information is determined for a plurality of devices. The plurality of devices may include all or some devices in a network or cloud network, either virtual or physical, which may be shared or dedicated to a particular user, entity, administrator, or partitioned in some other way known in the art.

According to one embodiment, command information may include individual commands that may be used to cause a device to perform a particular function or to change some aspect of a configuration of the device.

In another embodiment, operation 402 may further comprise retrieving one or more commands for each device, extracting command syntax, command inter-relationships, and parameter limitations for the one or more commands for each device, and storing the command syntax, the command inter-relationships, and the parameter limitations for the one or more commands for each device to a command index.

Furthermore, the one or more commands may be retrieved from existing syntactic and semantic models created for individual variants of devices. Additionally, the method 400 may further comprise separating the existing syntactic models describing syntax from the existing semantic models describing semantics prior to determining the command information.

Specifically, in one approach, the command structure may be determined from the existing syntactic models.

In operation 404, a command structure is identified from the command information which is common to a set of devices from the plurality of devices.

In one embodiment, operation 404 may include storing checksums for the command syntax for the one or more commands for each device to the command index and comparing the checksums in the command index to identify common entries in order to determine models which share one or more common commands.

Of course, any other method of identifying a command structure may be used, such as comparing syntax, comparing outcomes, comparing vendors, makes, models, or other information corresponding to or applicable to command structures, as described herein or as would be known by one of skill in the art upon reading the present descriptions.

Specifically, in one approach, identifying the common command structure may comprise grouping together devices into a set of devices for which a command syntax and resulting device behavior is common across all devices in the set of devices.

In operation 406, the set of devices is associated to a common configuration template. In this way, when a change is to be implemented across any or all of the devices in the set of devices, the common configuration template may be used to effect such a change without needing to determine which devices a template is applicable to, which commands to use, etc.

In a further embodiment, the method 400 may include determining that a change has been made to one of the plurality of devices that renders a common configuration template inapplicable to the changed device, and/or that a new device is present and the common configuration template is inapplicable to the new device; and implementing modifications to account for the change and/or new device in the common configuration template, thereby rendering the common configuration template applicable to the changed device and/or the new device.

For example, a change in a device such as a software revision, update, syntax change, etc. may or may not affect applicability of the common configuration template to the device, e.g., commands may no longer have common syntax between the configuration template and the device. Changes to the common configuration template may be made to overcome the syntactical changes so that the common configuration template is again applicable to the changed device.

In another example, when a new device is added to the complex system, it may be necessary to make changes to the common configuration template in order to ensure its applicability to the new device e.g., command structures may need to be altered in the common configuration template to align with the command structures of the new device.

Method 400 may be implemented in a computer program product or system. For example, in one embodiment, a computer program product for creating a configuration template for a set of devices comprises a computer readable storage medium having computer readable program code embodied therewith. The computer readable program code includes computer readable program code configured for determining command information for a plurality of devices, computer readable program code configured for identifying a command structure from the command information which is common to a set of devices from the plurality of devices, and computer readable program code configured for associating the set of devices to a common configuration template. Of course, any other embodiments and/or descriptions pertaining to method 400 may be used in conjunction with the computer program product, as would be appreciated by one of skill in the art upon reading the present descriptions.

Figure 5:
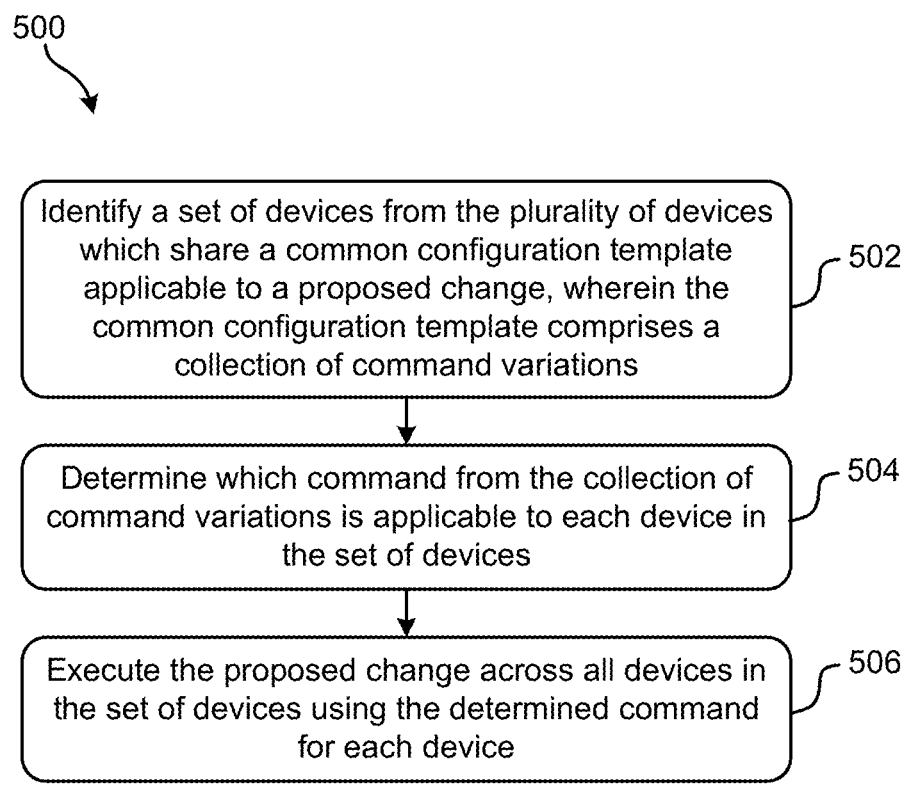
FIG. 5 shows a flowchart of a method, according to one embodiment.

Now referring to FIG. 5, a method 500 for using a common configuration template for a set of devices is described according to one embodiment. As an option, the present method 500 may be implemented in conjunction with features and/or architectures from any other embodiment described herein, such as those described with reference to FIGS. 1-3, among others. Referring again to FIG. 5, of course, method 500 and others presented herein may be used in various applications and/or in permutations which may or may not be specifically described in the illustrative embodiments described herein. Further, method 500 may be used in any desired environment known by one of skill in the art, whether described herein or not.

In operation 502, a set of devices from the plurality of devices is identified which share a common configuration template applicable to a proposed change. The common configuration template comprises a collection of command variations.

According to one embodiment, method 500 may include receiving the proposed change from a system administrator through a graphical user interface and/or through some other input method, such as from an application programming interface (API), using text, a mouse, a touchscreen, etc.

In operation 504, it is determined which command from the collection of command variations is applicable to each device in the set of devices.

In one approach, operation 504 may include automatically choosing, for each device in the set of devices, a command variation from the collection of command variations that is applicable to cause the proposed change in the device for which it is executed. In this way, an administrator is not required to implement or choose the specific command sequence which is used to effect the change, as it is automatically selected from the collection of command variations already determined for the set of devices that adhere to the common configuration template.

In operation 506, the proposed change is executed across all devices in the set of devices using the determined command for each device.

In more embodiments, method 500 may be repeated as necessary until all devices in the plurality of devices have the proposed change implemented thereon. For example, the method 500 may include identifying subsequent sets of devices from the plurality of devices which share common configuration templates applicable to the proposed change until all devices in the plurality of devices are placed in sets, determining which commands are applicable to devices in each subsequent set of devices, and executing the proposed change across all devices in each subsequent set of devices using the determined commands for the devices in each subsequent set of devices.

Moreover, method 500 may be implemented in a computer program product or system. For example, in one embodiment, a computer program product for using a common configuration template for a set of devices includes a computer readable storage medium having computer readable program code embodied therewith. The computer readable program code includes computer readable program code configured for identifying a set of devices from the plurality of devices which share a common configuration template applicable to a proposed change, wherein the common configuration template comprises a collection of command variations, computer readable program code configured for determining which command from the collection of command variations is applicable to each device in the set of devices, and computer readable program code configured for executing the proposed change across all devices in the set of devices using the determined command for each device. Of course, any other embodiments and/or descriptions pertaining to method 500 may be used in conjunction with the computer program product, as would be appreciated by one of skill in the art upon reading the present descriptions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium include the following: a portable computer diskette, a hard disk, a random access memory (RAM), a read-only memory (ROM), an erasable programmable read-only memory (EPROM or Flash memory), a portable compact disc read-only memory (e.g., CD-ROM), a Blu-ray disc read-only memory (BD-ROM), an optical storage device, a magnetic storage device, or any suitable combination of the foregoing. In the context of this document, a non-transitory computer readable storage medium may be any tangible medium that is capable of containing, or storing a program or application for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device, such as an electrical connection having one or more wires, an optical fiber, etc.

Program code embodied on a computer readable medium may be transmitted using any appropriate medium, including but not limited to wireless, wireline, optical fiber cable, fiber channel (FC), radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer, for example through the Internet using an Internet Service Provider (ISP).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart(s) and/or block diagram block or blocks.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product for creating a configuration template for a set of devices, the computer program product comprising a computer readable device having program instructions embodied therewith, the program instructions readable/executable by a hardware processor to cause the processor to:
   separate, by the processor, existing syntactic models describing syntax from existing semantic models describing semantics prior to determining a command information;
   determine, by the processor, the command information for a plurality of devices;
   identify, by the processor, a command structure from the command information which is common to a set of devices from the plurality of devices; and
   associate, by the processor, the set of devices to a common configuration template,
   wherein the program instructions readable/executable by the processor to cause the processor to determine, by the processor, command information for the plurality of devices are further readable/executable by the processor to cause the processor to:
      retrieve one or more commands for each device;
      extract command syntax, command inter-relationships, and parameter limitations for the one or more commands for each device; and
      store the command syntax, the command inter-relationships, and the parameter limitations for the one or more commands for each device to a command index.

2. The computer program product as recited in claim 1, wherein the command structure is determined from the existing syntactic models.

3. The computer program product as recited in claim 1, wherein the one or more commands are retrieved from the existing syntactic and semantic models created for individual variants of devices.

4. The computer program product as recited in claim 1, wherein the program instructions readable/executable by the processor to cause the processor to identify, by the processor, the common command structure are further readable/executable by the processor to cause the processor to:
   store checksums for the command syntax for the one or more commands for each device to the command index; and
   compare the checksums in the command index to identify common entries in order to determine models which share one or more common commands.

5. The computer program product as recited in claim 1, wherein the program instructions readable/executable by the processor to cause the processor to identify, by the processor, the common command structure are further readable/executable by the processor to cause the processor to group together devices into a set of devices for which a command syntax and resulting device behavior is common across all devices in the set of devices.

6. The computer program product as recited in claim 1, wherein the program instructions are readable/executable by the processor to cause the processor to:
   determine that a change has been made to one of the plurality of devices that renders a common configuration template inapplicable to the changed device, and/or that a new device is present and the common configuration template is inapplicable to the new device; and
   implement modifications to account for the changed and/or new device in the common configuration template, thereby rendering the common configuration template applicable to the changed device and/or the new device.

7. A computer program product, the computer program product comprising a computer readable device having program instructions embodied therewith, the program instructions readable/executable by a hardware processor to cause the processor to:
   retrieve, by the processor, one or more commands for each device of a plurality of devices from existing syntactic and semantic models created for individual variants of devices;
   identify, by the processor, a command structure from the one or more commands which is common to a set of devices from the plurality of devices;
   associate, by the processor, the set of devices to a common configuration template;
   extract command syntax, command inter-relationships, and parameter limitations for the one or more commands for each device; and
   store the command syntax, the command inter-relationships, and the parameter limitations for the one or more commands for each device to a command index,
   wherein the program instructions readable/executable by the processor to cause the processor to identify, by the processor, the common command structure are further readable/executable by the processor to cause the processor to:
      store, by the processor, checksums for the command syntax for the one or more commands for each device to the command index; and
      compare, by the processor, the checksums in the command index to identify common entries in order to determine models which share one or more common commands.

8. The computer program product as recited in claim 7, wherein the program instructions are further readable/executable by the processor to cause the processor to separate, by the processor, the existing syntactic models describing syntax from the existing semantic models describing semantics prior to determining the one or more commands.

9. The computer program product as recited in claim 7, wherein the command structure is determined from the existing syntactic models.

10. The computer program product as recited in claim 7, wherein the program instructions readable/executable by the processor to cause the processor to identify the common command structure is readable/executable by the processor to cause the processor to group together devices into a set of devices for which a command syntax and resulting device behavior is common across all devices in the set of devices.

11. The computer program product as recited in claim 7, wherein the program instructions are readable/executable by the processor to cause the processor to:
- determine, by the processor, that either: a change has been made to one of the plurality of devices, the change rendering a common configuration template inapplicable to a changed device, or a new device is present and the common configuration template is inapplicable to the new device; and
- implement, by the processor, modifications to account for the changed device or the new device in the common configuration template, thereby rendering the common configuration template applicable to the changed device or the new device.

\* \* \* \* \*